United States Patent
Lee et al.

(10) Patent No.: US 7,714,542 B2
(45) Date of Patent: May 11, 2010

(54) COMPACT SAFETY DEVICE FOR A POUCH-TYPE SECONDARY BATTERY UNIT HAVING MANY INDIVIDUAL BATTERIES

(75) Inventors: Hyung-Bok Lee, Seoul (KR); Byoung-Hyun Kang, Cheonan (KR)

(73) Assignee: Samsung SDI Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 850 days.

(21) Appl. No.: 10/728,850

(22) Filed: Dec. 8, 2003

(65) Prior Publication Data

US 2004/0119442 A1 Jun. 24, 2004

(30) Foreign Application Priority Data

Dec. 18, 2002 (KR) .................... 10-2002-0081072

(51) Int. Cl.
*H02J 7/00* (2006.01)
*H01M 6/42* (2006.01)
*H01M 6/46* (2006.01)

(52) U.S. Cl. .................. 320/134; 429/127; 429/131; 429/153; 429/154; 429/152; 429/151; 429/162

(58) Field of Classification Search .............. 320/112, 320/110, 107, 131; 429/126, 128, 163, 153, 429/154, 129, 304, 177, 151, 149, 157, 162, 429/150, 170, 175, 152

See application file for complete search history.

(56) References Cited

U.S. PATENT DOCUMENTS

| 5,582,931 A | * | 12/1996 | Kawakami | .................. 429/127 |
| 6,042,966 A | | 3/2000 | Cheu | |
| 6,106,973 A | | 8/2000 | Sonozaki et al. | |
| 6,117,576 A | * | 9/2000 | Sugai | ............................ 429/7 |

(Continued)

FOREIGN PATENT DOCUMENTS

JP 61-116771 6/1986

(Continued)

OTHER PUBLICATIONS

*Registration Determination Certificate* from the Chinese Intellectual Property Office issued in Applicant's corresponding Chinese Patent No. 200310123960.9 dated Jul. 23, 2008.

(Continued)

*Primary Examiner*—Edward Tso
*Assistant Examiner*—Alexis Boateng
(74) *Attorney, Agent, or Firm*—Robert E. Bushnell, Esq.

(57) ABSTRACT

A battery unit having at least two pouch type secondary battery cells and a single safety device serving each cell in the battery unit. Each individual battery or cell body fits into a space within a casing. The battery unit may use one or more casings. The battery cells are arranged such that the terminals of different battery cells are located near the terminals of other battery cells within the unit. These terminals are connected to the safety device. The safety device may be a safety circuit board that is positioned in a space within the battery unit so that the battery unit does not consume any more space than when no safety circuit board is used.

10 Claims, 7 Drawing Sheets

U.S. PATENT DOCUMENTS

| | | | |
|---|---|---|---|
| 6,218,041 B1* | 4/2001 | Barbier et al. | 429/96 |
| 6,225,778 B1* | 5/2001 | Hayama et al. | 320/112 |
| 6,423,449 B1* | 7/2002 | Hong | 429/231.95 |
| 6,451,474 B1* | 9/2002 | Kozu et al. | 429/100 |
| 6,451,476 B1 | 9/2002 | Chang et al. | |
| 6,482,544 B1 | 11/2002 | Shiota et al. | |
| 6,572,998 B2* | 6/2003 | Kageyama | 429/56 |
| D479,193 S | 9/2003 | Fujihara et al. | |
| 6,635,381 B2* | 10/2003 | Spillman et al. | 429/161 |
| 6,724,170 B1* | 4/2004 | Maggert et al. | 320/107 |
| 6,773,848 B1* | 8/2004 | Nortoft et al. | 429/158 |
| 6,822,420 B2* | 11/2004 | Kozu et al. | 320/107 |
| 2004/0212342 A1* | 10/2004 | Batson | 320/107 |
| 2005/0014036 A1* | 1/2005 | Kim | 429/7 |
| 2005/0058894 A1* | 3/2005 | Aamodt et al. | 429/128 |

FOREIGN PATENT DOCUMENTS

| | | |
|---|---|---|
| JP | 2000-090961 | 3/2000 |
| JP | 2000-156208 | 6/2000 |
| JP | 2001-210388 | 8/2001 |
| JP | 2001-256933 | 9/2001 |
| JP | 2001-351590 | 12/2001 |
| JP | 2002-216722 | 8/2002 |
| JP | 2003-257393 | 9/2003 |
| KR | 1999-5862 | 2/1999 |
| KR | 1999-54989 | 7/1999 |
| KR | 10-2000-0013159 A | 3/2000 |
| WO | WO 00/41253 | 7/2000 |

OTHER PUBLICATIONS

*Office action* from the Japanese Patent Office issued in Applicant's corresponding Japanese Patent Application No. 2003-401571 dated Dec. 11, 2007.

Transmitter letter and Korean office action issued by Korean Patent Office on Sep. 30, 2009, correspondence to Korean application No. 10-2002-0081072.

* cited by examiner

COMPACT SAFETY DEVICE FOR A POUCH-TYPE SECONDARY BATTERY UNIT HAVING MANY INDIVIDUAL BATTERIES

CLAIM OF PRIORITY

This application makes reference to, incorporates the same herein, and claims all benefits accruing under 35 U.S.C. §119 from an application entitled "POUCH TYPE SECONDARY BATTERY" earlier filed in the Korean Intellectual Property Office on 18 Dec. 2002 and thereby duly assigned Serial No. 2002-81072.

BACKGROUND OF THE INVENTION

1. Technical Field

The present invention relates to a secondary battery unit, and more particularly, to a secondary battery unit having two or more interconnected individual pouch type secondary battery cells, the battery unit having a single safety circuit board for all of the individual battery cells in the battery unit, the single safety circuit board not adding size, volume or bulk of the battery unit.

2. Related Art

Conventionally, secondary batteries have a small size and a high storage capacity, in addition to being rechargeable. Representative examples of such secondary batteries include nickel-hydrogen (Ni-MH) batteries and lithium (Li) secondary batteries.

According to the shapes of a case for accommodating a battery body, secondary batteries are classified as cylindrical batteries using cylindrical aluminum cans, prismatic batteries using prismatic aluminum cans, and pouch-type batteries using thin pouch-type cases.

Among them, the pouch-type secondary batteries has a battery body for generating a predetermined electric current and a pouch-type case for enclosing the battery body. The battery body further has a lead, which is connected to an electrode tab extended from a side of the battery body, to provide an electrical passage to the outside. Some parts of the lead are installed to be exposed from the pouch-type case.

The pouch-type case has a case body having a space for accommodating the battery body, and a case cover extending from an end of the case body and forming an integral structure with the case body. The edges of the case body are formed with flanges to seal the case body by coupling the case body with the case cover.

The pouch-type case of a pouch-type secondary battery with the above-described structure is made up of a mixed sheet of a metal foil and resin layers. By way of example, a pouch-type case is with aluminum foil may be formed by pressing together aluminum foil, a thermal adhesive layer and a resin layer. The thermal adhesive layer is formed at an inner surface of the aluminum foil. The thermal adhesive layer and the resin layer are sequentially formed at an outer surface of the aluminum foil. The thermal adhesive layer is made up of a polymer resin including modified polypropylene such as casted polypropylene (CPP). The resin layer is made up of nylon and polyethylene terephthalate. There exist pouch-type cases with various shapes including those as disclosed in U.S. Pat. Nos. 6,042,966 and 6,106,973.

Generally, the pouch-type secondary batteries with the above-described structure have a small storage capacity, and thus, are interconnected in parallel or series when used in electronic devices with a relatively high consumption of electric power such as notebook computers.

Meanwhile, the pouch-type secondary batteries further have a safety device for preventing explosion of the batteries due to a gas generated by an overcharge or an interelectrode short when charged or discharged. The safety device may be a safety circuit board with a positive temperature coefficient (PTC) device, and a safety vent, which is installed at a side of the case to change its structure according to the internal pressure of the case. The safety circuit board may be installed in each battery. Alternatively, in a case where multiple battery cells are interconnected in parallel or series, a single safety circuit board may be employed, the single circuit board being electrically connected to the terminals of each individual battery cell in a battery unit, which connects with electrode terminals of individual battery cells.

In this case, however, lead wires are required for connecting the safety circuit board with the electrode terminals of individual battery cells, and the installation of the safety circuit board produces many limitations. In particular, in the case where secondary battery cells are used in portable electric devices, the volume of the battery unit increases as a result of the area occupied by the safety circuit board. Therefore, it is difficult to limit the size of a secondary battery unit having multiple secondary battery cells interconnected in series or parallel via the safety circuit board.

One example of a battery unit comprising multiple secondary battery cells interconnected in parallel or series is disclosed in Korean Patent Laid-Open Publication No. 1999-54989. The battery unit comprises multiple individual battery cells are interconnected in parallel or series, each individual battery cell having alternately laminated multiple positive electrodes and multiple negative electrodes, which are separated by separators. The battery unit has a positive electrode connecting means for connecting the multiple positive electrodes to each other and negative electrode connecting means for connecting the multiple negative electrodes to each other.

Korean Patent Laid-Open Publication No. 1999-5862 discloses a secondary battery with an improved energy density by interconnecting in parallel electrodes with an integral structure of a current collector and an electrode terminal.

In the above-described secondary battery units, a separate safety circuit board must be installed at the side or front part of each battery cell, and thus, it is difficult to decrease the size of the battery unit.

SUMMARY OF THE INVENTION

It is therefore an object of the present invention to provide a design for a battery unit made up of more than one pouch type battery cell, the entire battery unit having a single safety device.

It is also an object of the present invention to provide a battery unit made up of more than one pouch type battery cell, the battery unit having a single safety device for the entire battery unit, the safety device not adding to the total volume of the battery unit.

It is still an object of the present invention to provide a better design for a battery unit having more than one pouch type battery cell where a single safety circuit board is used to protect the entire battery unit, the safety circuit board being connected to the terminals of the cells in the battery unit.

It is further an object of the present invention to provide a safety circuit board for a battery unit having more than one individual battery cell, each individual battery cell being disposed in its own casing, the single safety circuit board being connected to the terminals of the individual battery cells, the single safety circuit board not adding any volume to the battery unit.

It is further an object of the present invention to provide a safety circuit board for a battery unit having more than one individual battery cell, the entire battery unit having a single casing where each individual battery cell is disposed therein, the single safety circuit board being connected to the terminals of the individual battery cells, the single safety circuit board not adding any volume to the battery unit.

These and other objects may be achieved by a battery unit having at least two individual secondary pouch-type battery cells encased in a casing. The battery unit has a single safety circuit board or device that is used for all of the individual battery cells in the battery unit. The safety unit is disposed within the casing in such a way as not to add volume to the battery unit. The electrode terminals of the individual battery cells are interconnected with each other and with the safety circuit board. The casing for the battery unit may be a single casing for the entire battery unit, the single casing accommodating each of the individual batteries. Alternatively, each individual battery cell has its own casing. In either case, the casing has a body portion and a cover portion connected to the body portion, the body portion having a flanged portion.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
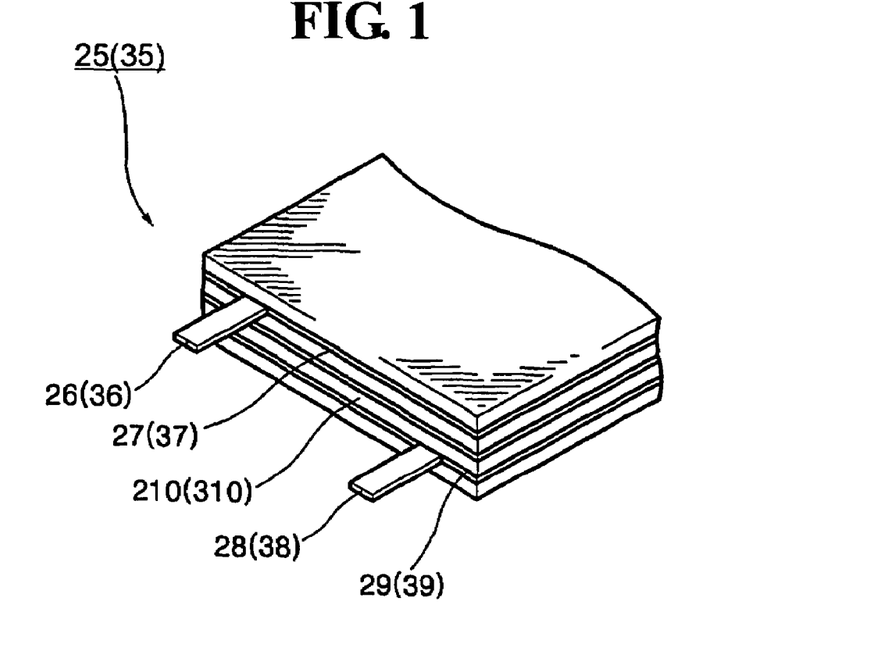
FIG. 1 is a partial cut-away perspective view of a battery body of stacked electrode plates unwounded, the battery body of FIG. 1 being a first variation of a battery body that can be used in the embodiments of the present invention.
Figure 2:
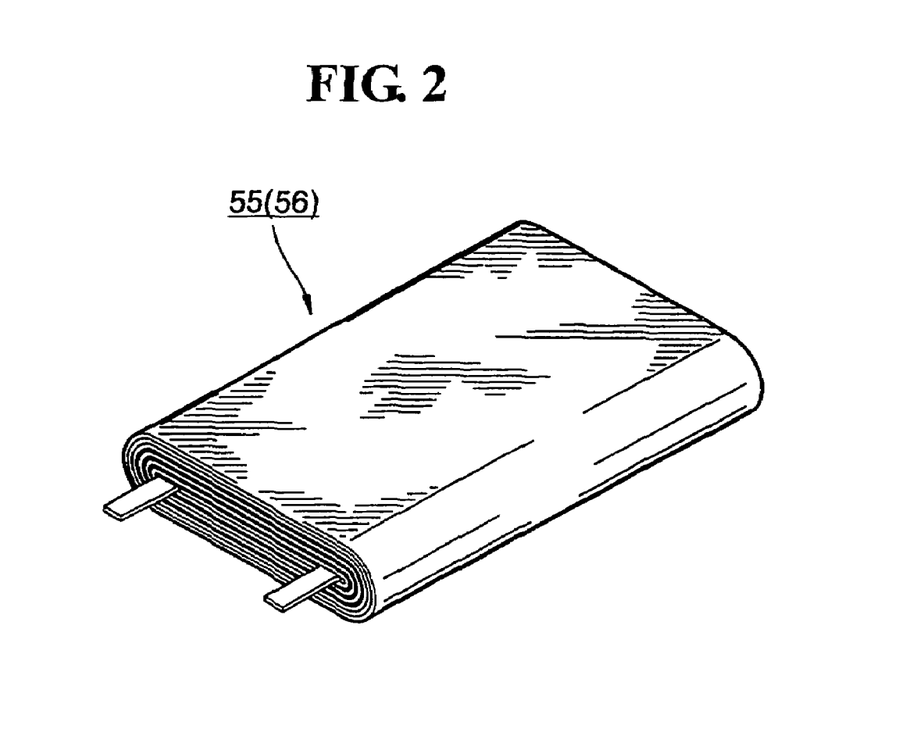
FIG. 2 is a perspective view of a battery body of electrode plates being helically wound, the battery body of FIG. 2 being a second variation of a battery body that can be used in the embodiments of the present invention.

Before discussing the embodiments of the present invention, the different types of battery bodies that can be used in the embodiments of the present invention will now be discussed. Turning to FIG. 1, FIG. 1 illustrates a first variation for a battery body which is a stacked electrode plate battery body 25 (35) that can be used in the embodiments of the present invention. The reason why two reference numerals are illustrated for each part in FIG. 1 is that if an embodiment to be described later has two individual battery cells using battery bodies according to FIG. 1, the first reference numeral is used for the first cell and the second reference numeral is used for the second cell, even though the two cells may be identical. As illustrated in FIG. 1, the stacked electrode plates are not wound. The first and second battery bodies 25 and 35 respectively of FIG. 1 each have positive electrode plates 27 and 37, which are formed by coating positive electrode current collectors with positive electrode active materials and are formed with the positive electrode terminals 26 and 36, negative electrode plates 29 and 39, which are formed by coating negative electrode current collectors with negative electrode active materials and are formed with the negative electrode terminals 28 and 38, and separators 210 and 310 interposed therebetween, as illustrated in FIG. 1. Alternately, the battery bodies used in the embodiments that follow can be the battery body 55 (56) illustrated in FIG. 2. In this second variation, battery body 55 (56) are stacked electrode layers helically wound. The first and second battery bodies 55 and 56 may be formed by helically winding strip-shaped positive and negative electrode plates, as illustrated in FIG. 2. In this present invention, the term "battery unit" means a group of individual batteries (or cells) interconnected in parallel or in series.

Figure 3A:
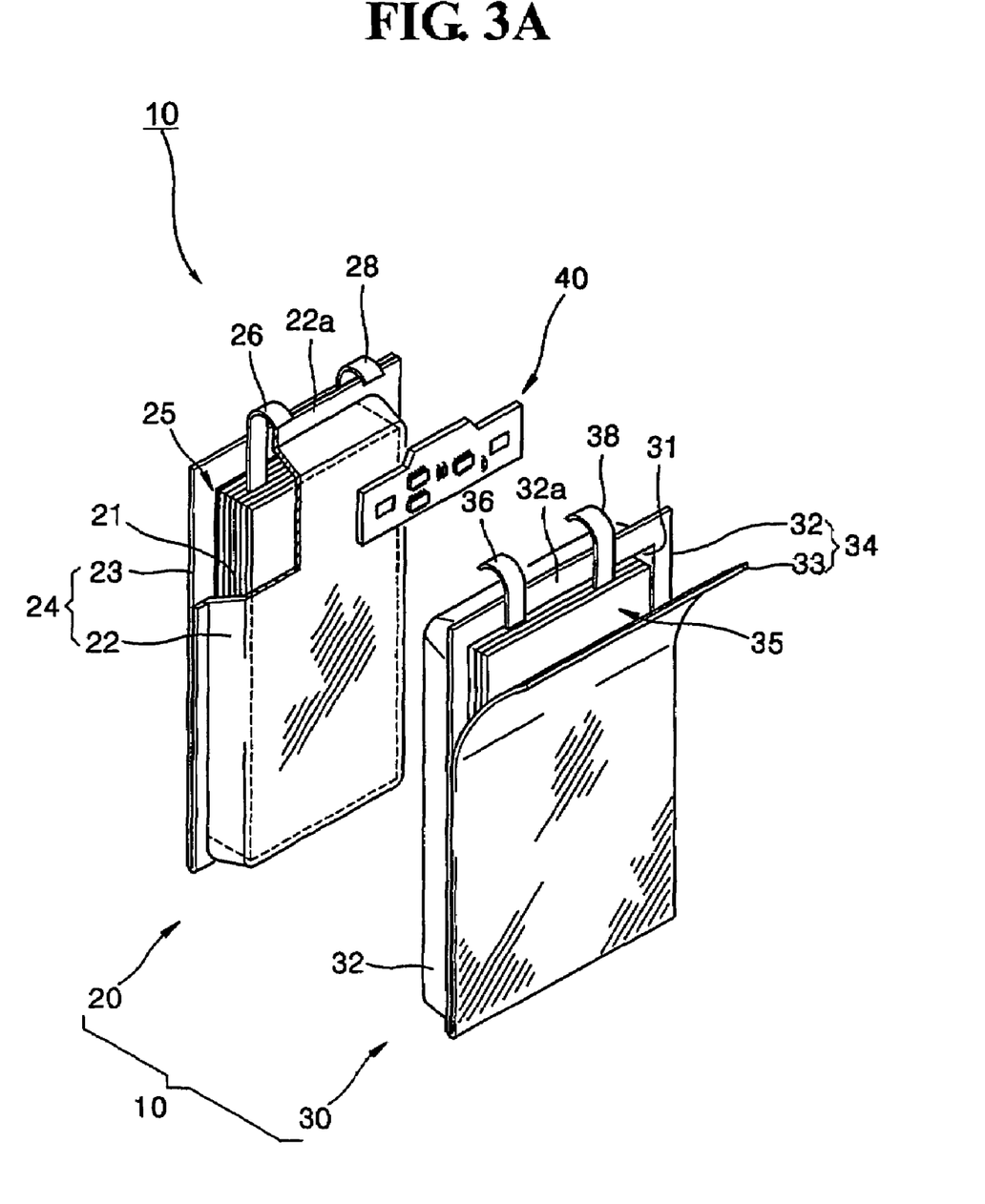
FIG. 3A is an exploded perspective view of a pouch-type secondary battery unit according to a first embodiment of the present invention, wherein the individual cells of the battery unit are in separate cases, FIG. 3A illustrating the first embodiment according to the first variation of battery bodies of FIG. 1.
Figure 3B:
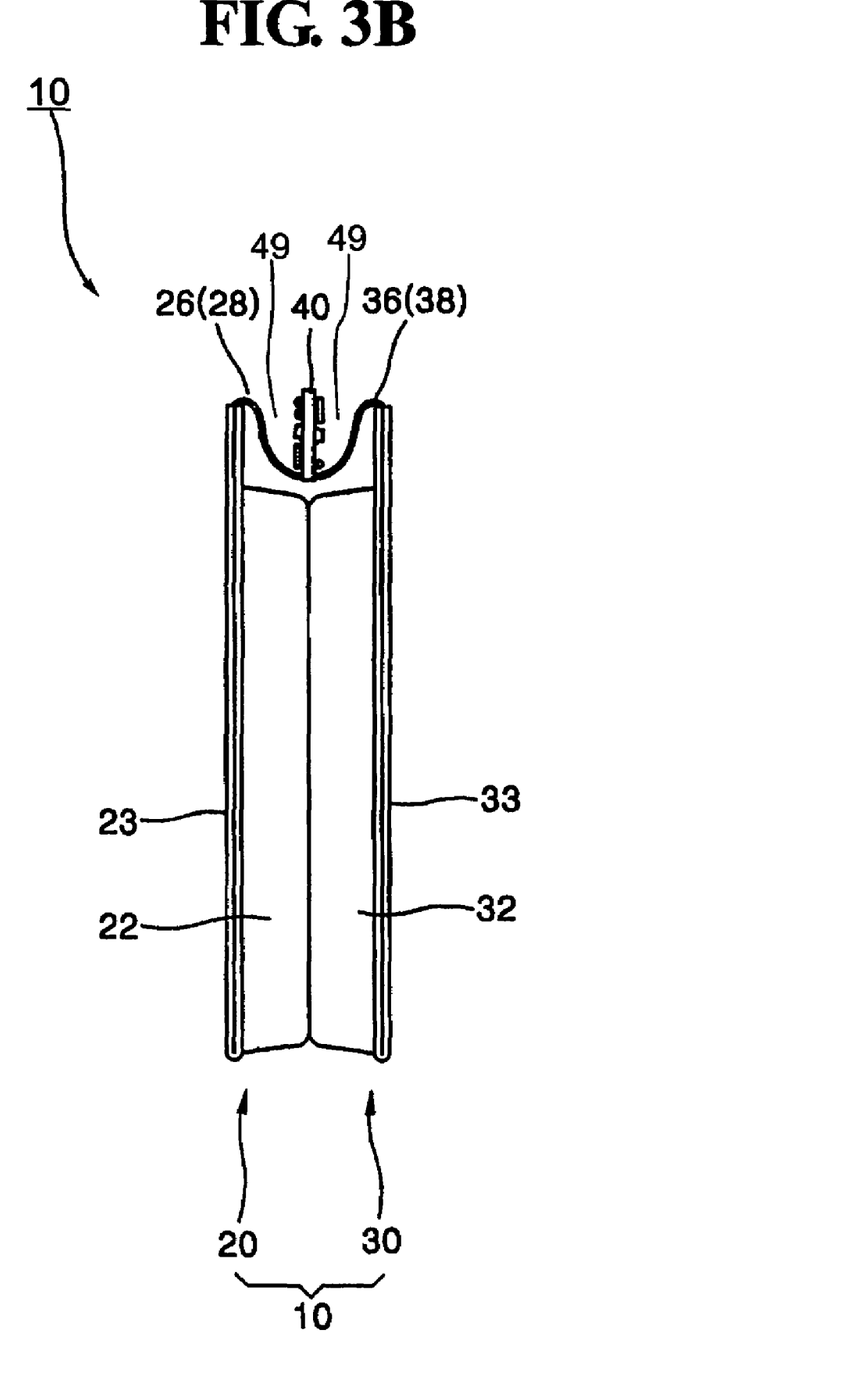
FIG. 3B is a side view when assembled of the pouch-type secondary battery unit of FIG. 3A.

Turning now to the embodiments of the present invention, FIGS. 3A and 3B illustrate a battery unit 10 according to the first embodiment of the present invention. Referring to FIGS. 3A and 3B, the battery unit 10 has a first and second pouch-type secondary battery cells 20 and 30, and a safety circuit board 40, which is installed in a space between the first and second secondary battery cells 20 and 30. Safety circuit board 40 electrically connects first and second positive electrode terminals 26 and 36 and first and second negative electrode terminals 28 and 38 of cells 20 and 30 together.

The first and second secondary battery cells 20 and 30 are made up of first and second cases 24 and 34, respectively. The first and second cases 24 and 34 respectively are made up of first and second case bodies 22 and 32, which are formed with first and second spaces 21 and 31 with a predetermined depth, and first and second case covers 23 and 33, which are coupled with the first and second case bodies 22 and 32 to seal the first and second spaces 21 and 31. Here, the first and second cases 24 and 34 have a flexible structure by coating a metal foil, for example, an aluminum foil, with a composite resin material, but is not limited thereto. As illustrated in FIGS. 3A and 3B, battery unit 10 has two battery (or cell) bodies 25 and 35, and two cases 24 and 34, respectively, one case for each battery body.

In the case of a lithium secondary battery, generally, aluminum foils are used as the positive electrode current collectors and copper foils are used as the negative electrode current collectors. The positive electrode active materials are mixtures including lithium-based oxides and the negative electrode active materials are mixtures including carbonaceous materials.

When the first battery body 25 is inserted in the first space 21 and when the first case body 22 and the first case cover 23 are coupled with each other, the first positive and negative electrode terminals 26 and 28 are exposed from a side of the coupled first case body 22 and cover 23. On the other hand, when the second battery body 35 is inserted in the second space 31 and when the second case body 32 and the second case cover 33 are coupled with each other, the second positive and negative electrode terminals 36 and 38 are protruded from a side of the coupled second case body 32 and cover 33. The two battery cells 20 and 30 are aligned so that the first positive electrode terminal 26 is adjacent to the second positive electrode terminal 36 and the first negative electrode terminals 28 is adjacent to the second negative electrode terminal 38. That is, the first and second secondary battery cells 20 and 30 are installed in such a manner that the same polarity terminals of the two secondary battery cells face each other.

Meanwhile, the safety circuit board 40 is positioned between the interconnected first and second battery cells 20 and 30 and connects with the first and second positive electrode terminals 26 and 36 and the first and second negative electrode terminals 28 and 38. Preferably, the safety circuit board 40 is installed between a flange portion 22a of the first case body, from which the first positive and negative electrode terminals extend outward, and a flange portion 32a of the second case body, from which the second positive and negative electrode terminals extend outward. This way, the inclusion of safety circuit board 40 does not add to the overall size or volume of the battery unit 10.

Preferably, the first and second secondary battery cells 20 and 30 are arrayed in such a manner that protruded outer surfaces of the first and second spaces 21 and 31 come in contact with each other, so that the flange portions 22a and 32a are separated from each other with safety circuit board 40 disposed therebetween flanges 22a and 32a, thus not resulting in an increased volume of the battery unit 10. This external void 49 is between flanges (or flanged portions) 22a and 32a. External void 49 is really a space that is external to the cases and is between the cases when the cases are stacked onto each other as in FIG. 3B. External void 49 is external to any of the cases but is located between two adjoining cases. Safety circuit board 40 is disposed within external void 49. Because safety circuit board 40 is within external void 49, safety circuit board 40 does not add any volume or bulk to battery unit 10.

The first embodiment thus far has been described in terms of using the stacked electrode plates of FIG. 1 as the battery bodies 25 and 35 in battery unit 10. However, this invention is not limited thereto. Alternatively, the helically wound battery bodies 55 and 56 of FIG. 2 can be used in the first embodiment instead of the stacked electrode battery bodies 25 and 35 of FIG. 1. Also, one battery body may be stacked and the other may be helically wound. Thus, the arrangement of FIGS. 3A and 3B may mix or match stacked or helically wound batteries.

Figure 4:
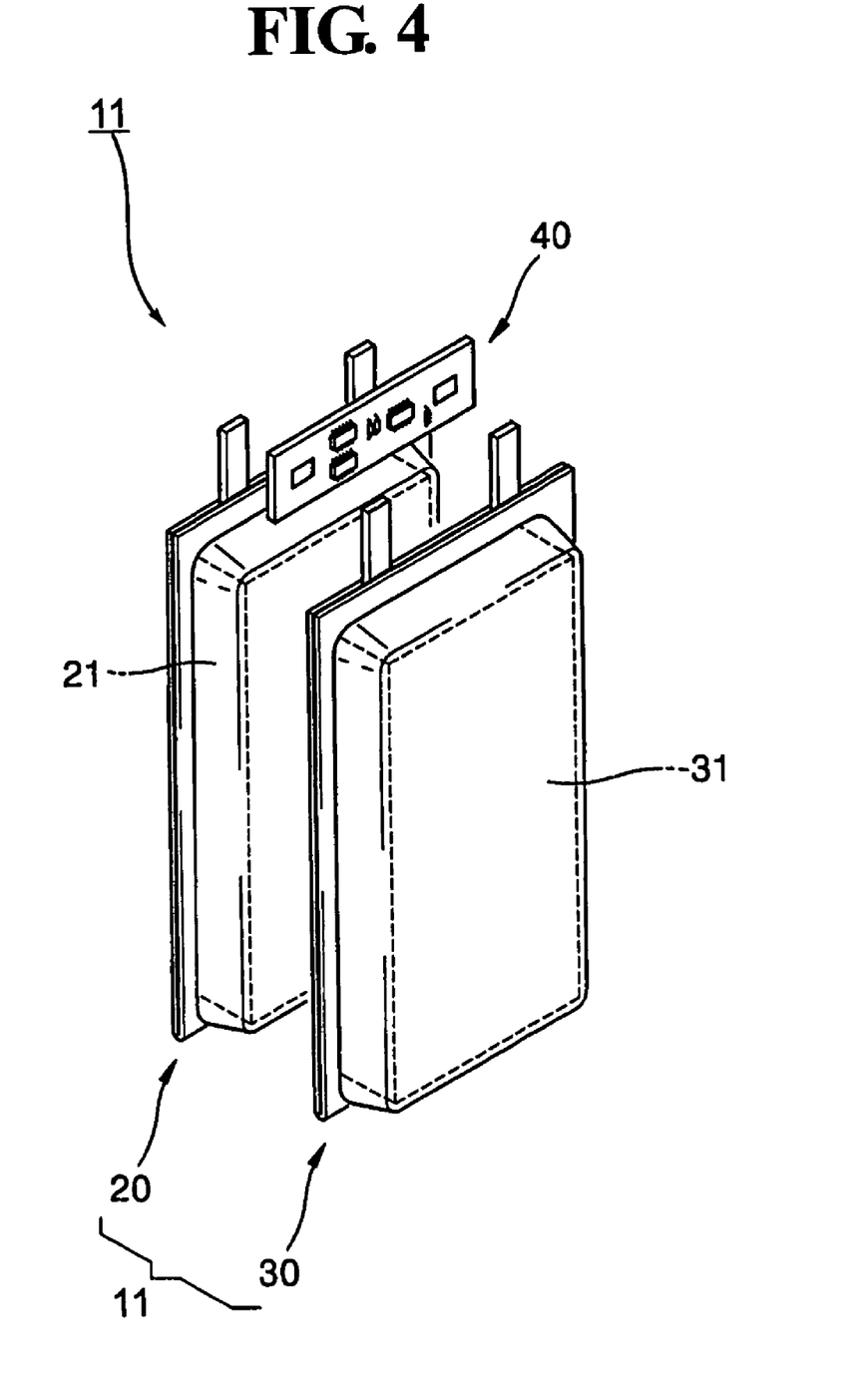
FIG. 4 is a perspective view of a pouch-type secondary battery unit according to a second embodiment of the present invention.

Turning to FIG. 4, FIG. 4 illustrates a battery unit 11 according to the second embodiment of the present invention. FIG. 4 is similar to the embodiment of FIGS. 3A and 3B except that first and second spaces 21 and 31 are arrayed in the same directions in FIG. 4 as opposed to opposite directions in FIGS. 3A and 3B. As with the first embodiment, in the second embodiment of FIG. 4, it is preferable to install the first and second battery cells 20 and 30 in such a manner that the first and second positive electrode terminals face each other and the first and second negative electrode terminals face each other. As with the first embodiment, the second embodiment may mix or match either the stacked electrode battery bodies 25 and 35 of FIG. 1 or the helically wound battery (or cell) bodies 55 and 56 as illustrated in FIG. 2.

Figure 5A:
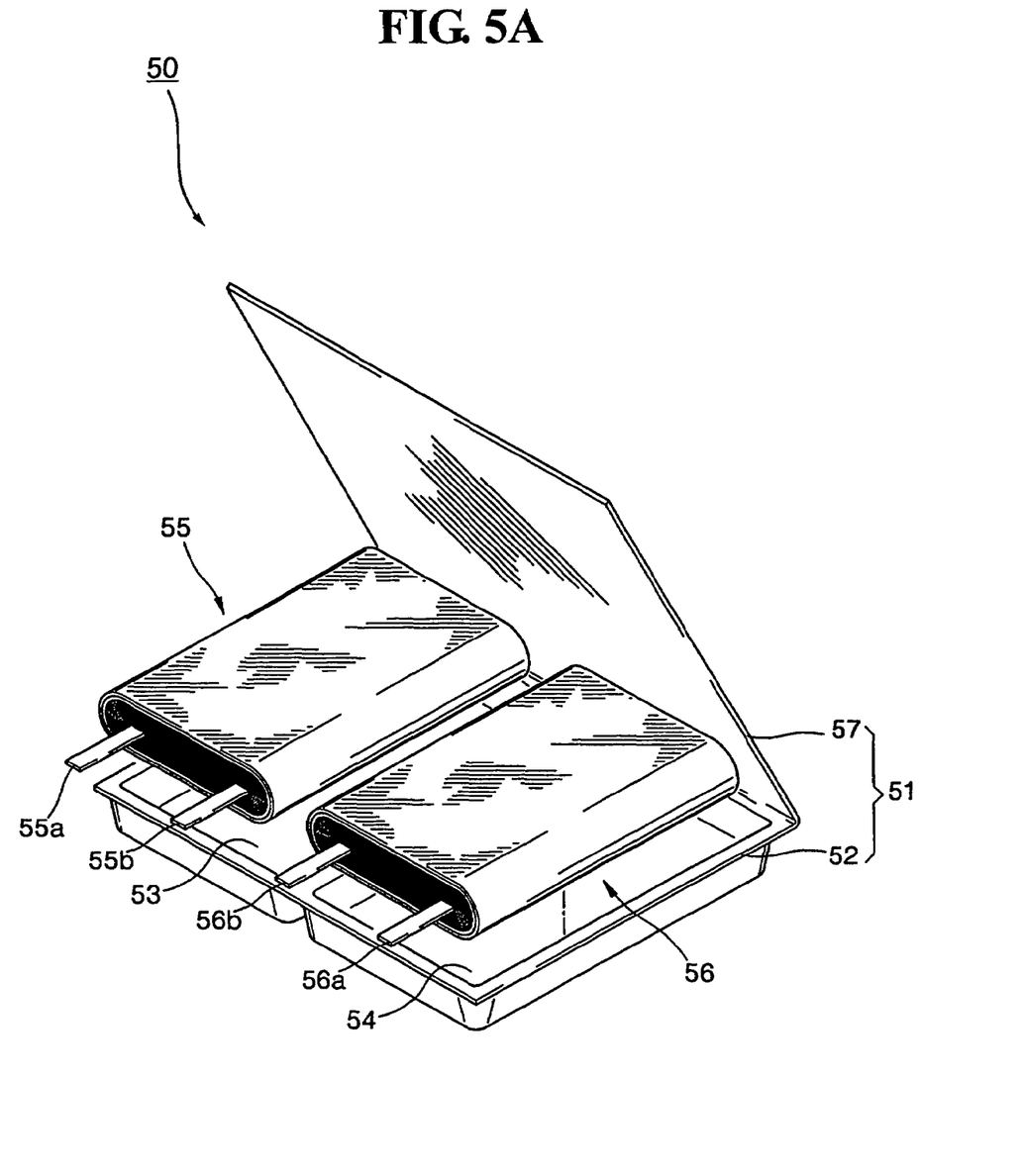
FIG. 5A is a perspective view of a pouch-type secondary battery unit according to a third embodiment of the present invention using the helically wound type battery body of FIG. 2.
Figure 5B:
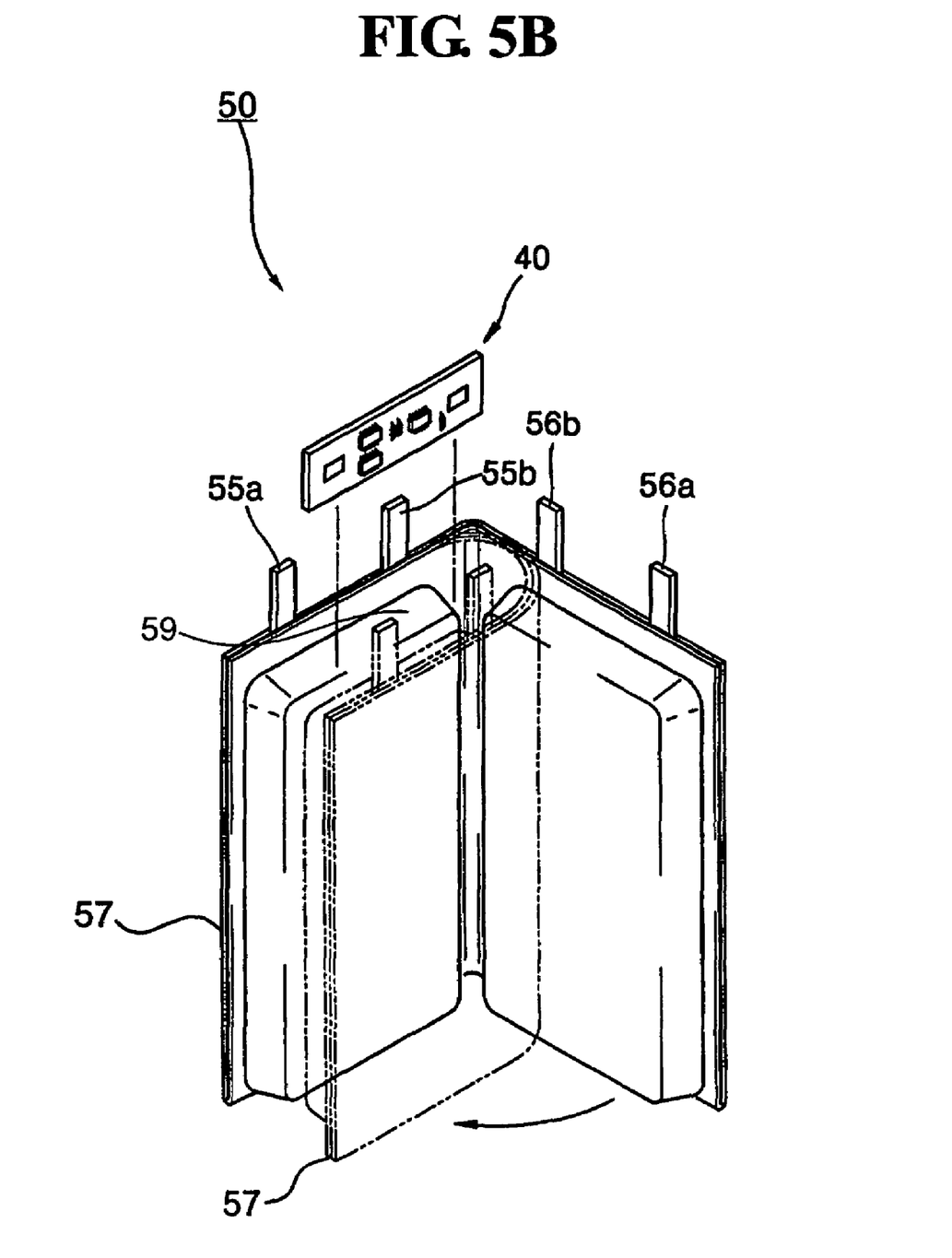
FIG. 5B is a perspective view illustrating folding of the pouch-type secondary battery unit of FIG. 5A.

Turning to FIGS. 5A and 5B, FIGS. 5A and 5B illustrate a pouch-type secondary battery unit 50 according to a third embodiment of the present invention. Referring to FIGS. 5A and 5B, the pouch-type secondary battery unit 50 has only a single case 51 and first and second battery bodies 55 and 56. In FIGS. 5A and 5B, helically wound batteries 55 and 56 are illustrated, but stacked type batteries of FIG. 1 may instead be used. In addition, one of the battery bodies may be helically wound and the other may be stacked.

The case 51 has a case cover 57 and a case body 52, which is formed with two spaces 53 and 54 (FIG. 5A), which are spaced apart from each other by a predetermined distance. The first battery body 55 has first positive and negative electrode terminals 55a and 55b and the second battery body 56 has second positive and negative electrode terminals 56a and 56b. The battery bodies 55 and 56 are inserted into the respective spaces 53 and 54 of the case 51.

The case body 52 is coupled with the case cover 57 to seal the spaces 53 and 54. The case body 52 and the case cover 57 may be formed to have an integral structure. The secondary battery unit 50 is folded (FIG. 5B) in such a manner that protruded outer surfaces of the spaces 53 and 54 of the case body 52 come in contact with each other and form a external void 59 between the electrode terminals 55a, 55b, 56a, 56b and between the opposite portions of the folded cover 57. Unlike spaces 53 and 54, external void 59 is not sealed within case 51. Instead, external void 59 is formed between separate folded sections of case 51, each section containing a separate pouch type battery cell. External void 59 is really a space that is external to the case and is disposed between adjoining sections of the case when the case is folded onto itself as in FIG. 5B. In this external void 59, a safety circuit board 40 can be positioned as illustrated in FIG. 5B. As illustrated in FIG. 5B, because safety circuit board 40 is within external void 59 of battery unit 50, safety circuit board 40 does not add any volume or bulk to battery unit 50. In this case, the first and second positive electrode terminals 55a and 56a and the first and second negative electrode terminals 55b and 56b are connected to a signal line of the safety circuit board 40. Preferably, the first and second positive electrode terminals 55a and 56a face each other and the first and second negative electrode terminals 55b and 56b face each other. The battery bodies 55 and 56 may be the same as battery bodies 55 and 56 in FIG. 2 or may be instead like battery bodies 25 and 35 in FIG. 1.

Figure 6:
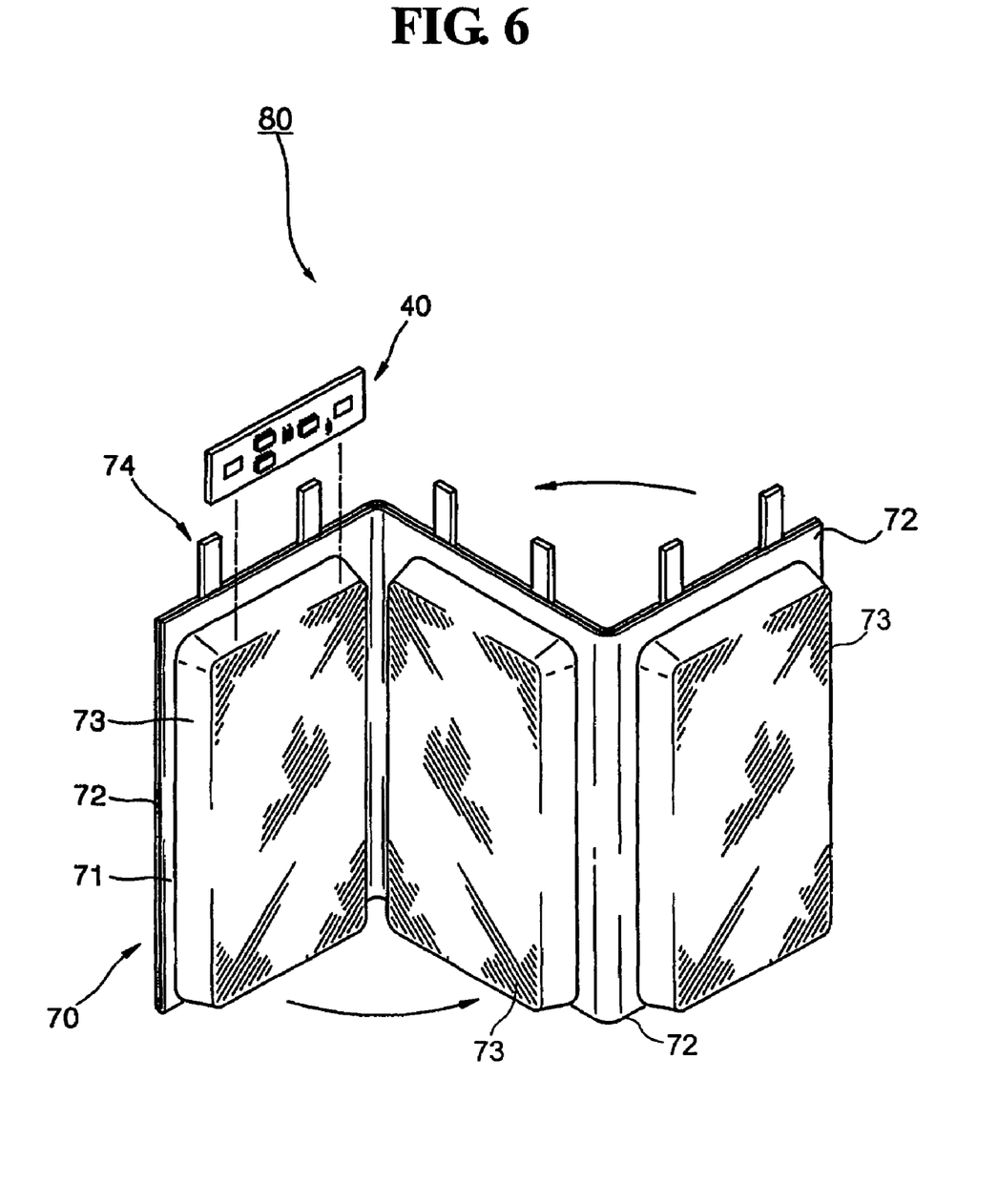
FIG. 6 is a perspective view of a pouch-type secondary battery unit according to a fourth embodiment of the present invention.

FIG. 6 illustrates a pouch-type secondary battery unit 80 according to the fourth embodiment of the present invention. Referring to FIG. 6, a case 70 is made up of a case body 71 and a case cover 72. The case body 71 is formed with in-line multiple spaces 73. Battery bodies (not illustrated) with exposed electrode terminals 74 are disposed within respective spaces 73. The case 70 is folded in such a manner that the battery bodies overlap each other forming voids therebetween. A safety circuit board 40 is installed in a void defined among the spaces 73 containing battery bodies. As with the other embodiments, the battery bodies may be helically wound as in FIG. 2 or stacked as in FIG. 1 or a combination thereof.

As apparent from the above description, in a pouch-type secondary battery unit according to the present invention, a safety circuit board is installed in an extra void or space defined between individual secondary battery cells, and thus, the volume of the battery unit is not increased by the inclusion of the safety circuit board. In particular, at least two secondary battery cells use a single or common safety circuit board protecting each cell within the battery unit, and thus, the number of the constitutional elements of the secondary battery unit can be reduced.

While the present invention has been particularly illustrated and described with reference to exemplary embodiments thereof, it will be understood by those of ordinary skill in the art that various changes in form and details may be made therein without departing from the spirit and scope of the present invention as defined by the following claims.

What is claimed is:

1. A pouch-type secondary battery unit, comprising:
a case comprising a case body having a plurality of spaces, each one of said plurality of spaces being spaced apart from each other by a predetermined distance, said case further comprising a case cover extending from a side of the case body and coupled with the case body to seal all the plurality of spaces, wherein the case cover is folded such that the spaces are stacked on top of each other;
a plurality of battery cells, each battery cell having a battery body and two electrode terminals, each battery body being disposed in respective ones of said plurality of spaces, each of said battery bodies having positive and negative electrode terminals extending outward through the case; and
a safety circuit board, disposed in an external void defined by the folding of the case cover, the safety circuit board being connected to each of said positive electrode terminals and the negative electrode terminals of each of said plurality of battery cells.

2. The battery unit of claim 1, wherein the case body comprises a flanged portion, the positive and negative electrode terminals extending through the flanged portion.

3. The battery unit of claim 1, wherein the positive electrode terminals of different battery cells in the battery unit are all aligned with each other and the negative electrode terminals of the different battery cells in the battery unit are all aligned with each other.

4. The battery unit of claim 1, wherein each of the battery bodies being helically wound positive and negative electrode plates.

5. A pouch type battery unit, comprising:
a case comprising a case body and a cover, the case body being attached to the cover, said case body comprising a plurality of spaces;
a plurality of battery bodies, each one being disposed in corresponding ones of said plurality of spaces, each of said battery bodies having two electrode terminals perforating said case body; and
a safety device electrically connected to said terminals of said battery bodies, said case body having a flanged portion that mates with said cover, said safety device being disposed in between two separate sections of said flanged portion when said case is folded onto itself so that each of said plurality of battery bodies are stacked on top of each other.

6. The battery unit of claim 5, said cover of said case being folded onto itself so that each of said plurality of battery bodies are stacked on top of each other.

7. The battery unit of claim 5, each of said plurality of battery bodies being comprised of electrode plates stacked on top of each other and not being wound.

8. The battery unit of claim 5, each of said plurality of battery bodies being comprised of electrode plates being helically wound.

9. The battery unit of claim 5, each of said plurality of battery bodies being electrically connected to each other in seriatim.

10. The battery unit of claim 5, each of said plurality of battery bodies being electrically connected to each other in parallel.

* * * * *